(12) United States Patent
Stapleton

(10) Patent No.: US 9,187,190 B1
(45) Date of Patent: Nov. 17, 2015

(54) CONCENTRIC SPLIT FLOW FILTER

(71) Applicant: Hamilton Sundstrand Space Systems International, Inc., Windsor Locks, CT (US)

(72) Inventor: Thomas J. Stapleton, Southwick, MA (US)

(73) Assignee: HAMILTON SUNDSTRAND SPACE SYSTEMS INTERNATIONAL, INC., Windsor Locks, CT (US)

( * ) Notice: Subject to any disclaimer, the term of this patent is extended or adjusted under 35 U.S.C. 154(b) by 0 days.

(21) Appl. No.: 14/340,207

(22) Filed: Jul. 24, 2014

(51) Int. Cl.
*B64G 1/48* (2006.01)
*B01D 46/00* (2006.01)

(52) U.S. Cl.
CPC .............. *B64G 1/48* (2013.01); *B01D 46/0021* (2013.01); *B01D 46/0038* (2013.01)

(58) Field of Classification Search
CPC .... B64G 1/48; B01D 46/0021; B01D 46/038; B01D 46/005; F02M 35/024
USPC ............................................. 55/484; 95/286
See application file for complete search history.

(56) References Cited

U.S. PATENT DOCUMENTS

| | | | | |
|---|---|---|---|---|
| 533,854 A * | 2/1895 | Loeb | ................. | 128/200.11 |
| 1,499,864 A * | 7/1924 | Gordon | ................. | 55/484 |
| 2,176,097 A * | 10/1939 | Pascale | ................. | 55/324 |
| 2,213,433 A * | 9/1940 | Punton | ................. | 55/350.1 |
| 3,591,945 A * | 7/1971 | Eisel | ................. | 96/416 |
| 3,807,150 A * | 4/1974 | Maracle | ................. | 55/498 |
| 4,737,174 A * | 4/1988 | Pontius | ................. | 96/138 |
| 5,309,823 A * | 5/1994 | Allen | ................. | 99/295 |
| 5,453,117 A * | 9/1995 | Carter et al. | ................. | 95/279 |
| 5,464,056 A * | 11/1995 | Tajima et al. | ................. | 165/167 |
| 5,549,822 A * | 8/1996 | Ferguson | ................. | 210/238 |
| 5,702,506 A * | 12/1997 | Shih et al. | ................. | 95/287 |
| 6,090,187 A * | 7/2000 | Kumagai | ................. | 95/278 |
| 6,702,941 B1 * | 3/2004 | Haq et al. | ................. | 210/315 |
| 2002/0128603 A1 * | 9/2002 | Booth et al. | ................. | 604/164.01 |
| 2010/0162672 A1 * | 7/2010 | Kim | ................. | 55/365 |
| 2010/0212500 A1 * | 8/2010 | Gross et al. | ................. | 95/279 |
| 2012/0258014 A1 * | 10/2012 | Howe et al. | ................. | 422/122 |
| 2012/0285901 A1 * | 11/2012 | Holm et al. | ................. | 210/790 |

OTHER PUBLICATIONS

Thomas J. Stapleton, Shelley Baccus, James L. Brown Jr., Development of a Universal Waste Management System, 43rd International Conference on Environmental Systems, Jul. 14-18, 2013, Vail, CO, pp. 1-5, American Institute of Aeronautics and Astronautics, Inc., with Permission.

* cited by examiner

*Primary Examiner* — Amber R Orlando
*Assistant Examiner* — Britanny Precht
(74) *Attorney, Agent, or Firm* — Snell & Wilmer, LLP

(57) ABSTRACT

A concentric split flow filter may be configured to remove odor and/or bacteria from pumped air used to collect urine and fecal waste products. For instance, filter may be designed to effectively fill the volume that was previously considered wasted surrounding the transport tube of a waste management system. The concentric split flow filter may be configured to split the air flow, with substantially half of the air flow to be treated traveling through a first bed of filter media and substantially the other half of the air flow to be treated traveling through the second bed of filter media. This split flow design reduces the air velocity by 50%. In this way, the pressure drop of filter may be reduced by as much as a factor of 4 as compare to the conventional design.

11 Claims, 3 Drawing Sheets

CONCENTRIC SPLIT FLOW FILTER

GOVERNMENT LICENSE RIGHTS

This disclosure was made with government support under contract No. NNJ12HF15D awarded by the National Aeronautics and Space Administration ("NASA"). The government has certain rights in the disclosure.

FIELD

The present disclosure relates to a filter and, more specifically, an axial flow filter.

BACKGROUND

Conventionally, in the Space Shuttle and International Space Station (ISS), the Waste Collector System (WCS) has used air flow to entrain waste. Urine is collected in a funnel held in close proximity to the urethra. Fecal material is collected separately by air flow entrainment. For instance, air may enter in a fairly uniform radial direction under a seat of the WCS. Air drag then helps separate the fecal bolus and draw it into a tank or fecal collection bag. Air is separated from the urine and fecal material, treated for odors, and returned to the spacecraft cabin.

Successful capture and ease of use for simultaneous urination and defecation for mixed gender crews have been consistent limitations of the Space Shuttle and ISS WCS. Additionally, these systems are sensitive to crew alignment on the seat and can result in inadvertent fouling of the collection hardware with fecal material.

The ISS WCS shared many features of the Space Shuttle WCS, but modified the fecal collection from a large storage tank to a removable fecal canister. Using plastic lids, a compactor compressed each individual fecal bag to reduce storage volume. After about 21 uses, the canisters are removed, and stored. To improve air flow predictability, a fan was included for the urine separator, and a separate fan was provided for fecal collection. The toilet on the Russian Soyuz vehicle (Soyuz ACY) is smaller than the Space Shuttle WCS and the ISS WCS. It pulls cabin air through the urine funnel and fecal collector before passing through a static separator, where the urine is stored. The saturated air travels through an odor filtration device before the urine and cabin air are separated by a centrifugal unit. The fecal collection bag is designed for a single use, and the urine tank is limited to 10.2 liters. Urine collection is considered acceptable, whereas fecal collection did not receive favorable review.

The Russian Module toilet (SM ACY) for the ISS has provided long-term WCS use since the ISS was first inhabited. It uses air to assist fecal and urine collection. A centrifugal urine separator removes air from the urine stream. The air flows to a charcoal filter prior to reentry back into the cabin. This unit has an air ring under the seat, similar to the two American designs discussed, to control odor and assist in fecal capture. The fecal canister holds one bag that is pushed into a collection tank after each use. This tank can hold about 21 defecations before removing and replacing the canister. From a crew-satisfaction perspective, the WCS is one of the most personal and intimate systems on the spacecraft. Crew consensus is paramount regarding which elements are needed and which would benefit from improvement.

SUMMARY

According to various embodiments, a filter unit is described herein. The filter unit may comprise a housing having a first outlet, a second outlet and an inlet plenum there-between. The housing may be generally hollow cylinder shaped. The filter unit may comprise a first filter media positioned within the housing between the inlet plenum and the first outlet. The filter unit may comprise a second filter media positioned within the housing between the inlet plenum and the second outlet. The first filter media and the second filter media may be disposed axially on opposite sides of the inlet plenum.

According to various embodiments, a method of treating air through a waste collector system comprises receiving via an air flow inlet air flow to be treated by a filter system. The method may include passing the air flow to be treated from the air flow inlet to an inlet air flow plenum of the filter system. The method may include reducing air flow velocity of the air flow to be treated through the inlet air flow plenum by about 50% by passing a first portion flow of air to be treated from the inlet air flow plenum to a first bed of filter media and passing a second portion flow of air to be treated from the inlet air flow plenum to a second bed of filter media of the filter system. The method may include delivering the passed first portion flow of air to be treated to a delivery location via a first outlet. The method may include delivering the passed second portion flow of air to be treated to the delivery location via a second outlet.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step.

Figure 1:
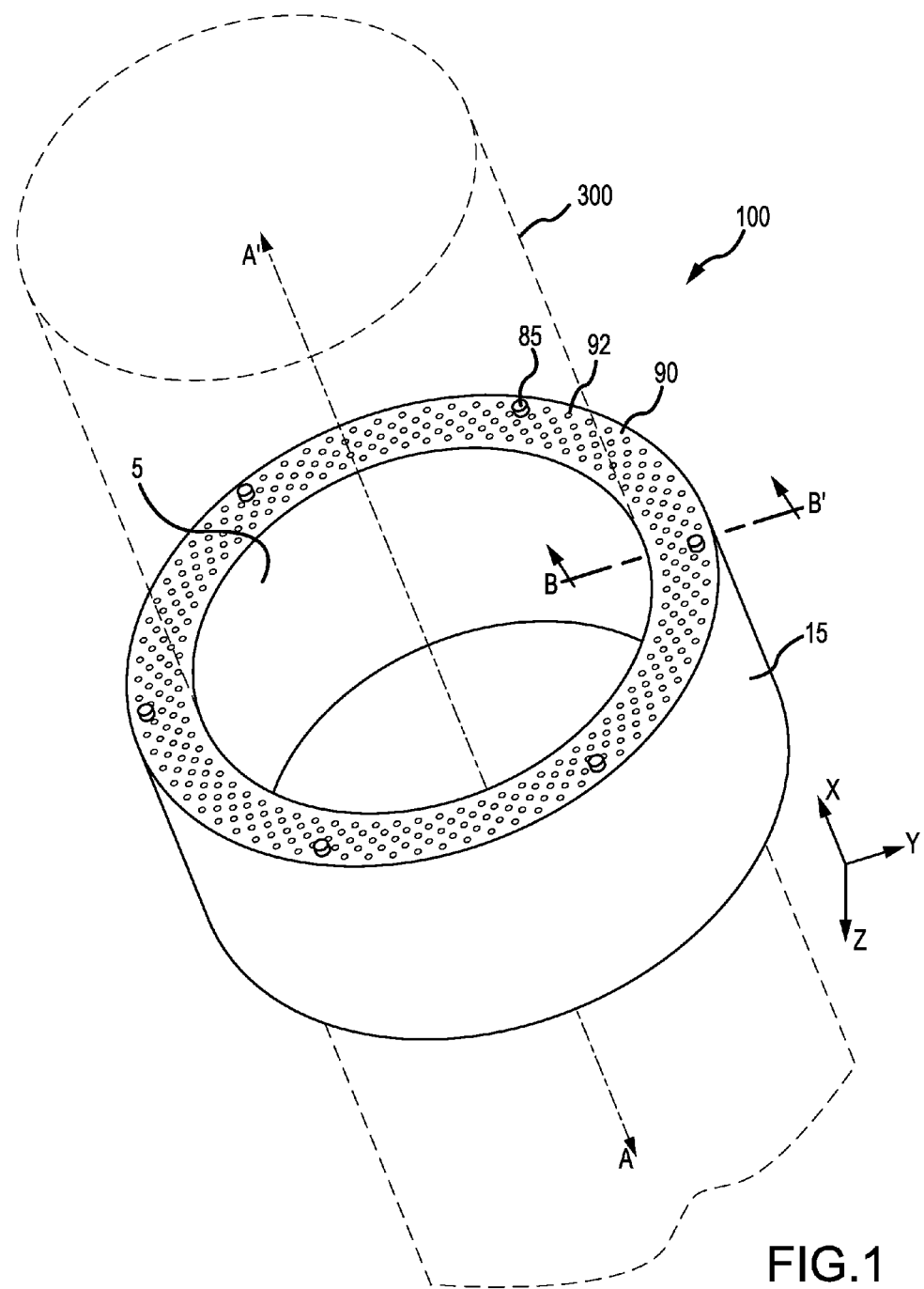
FIG. 1 is a representative diagram of a split flow filter in accordance with various embodiments.
Figure 2:
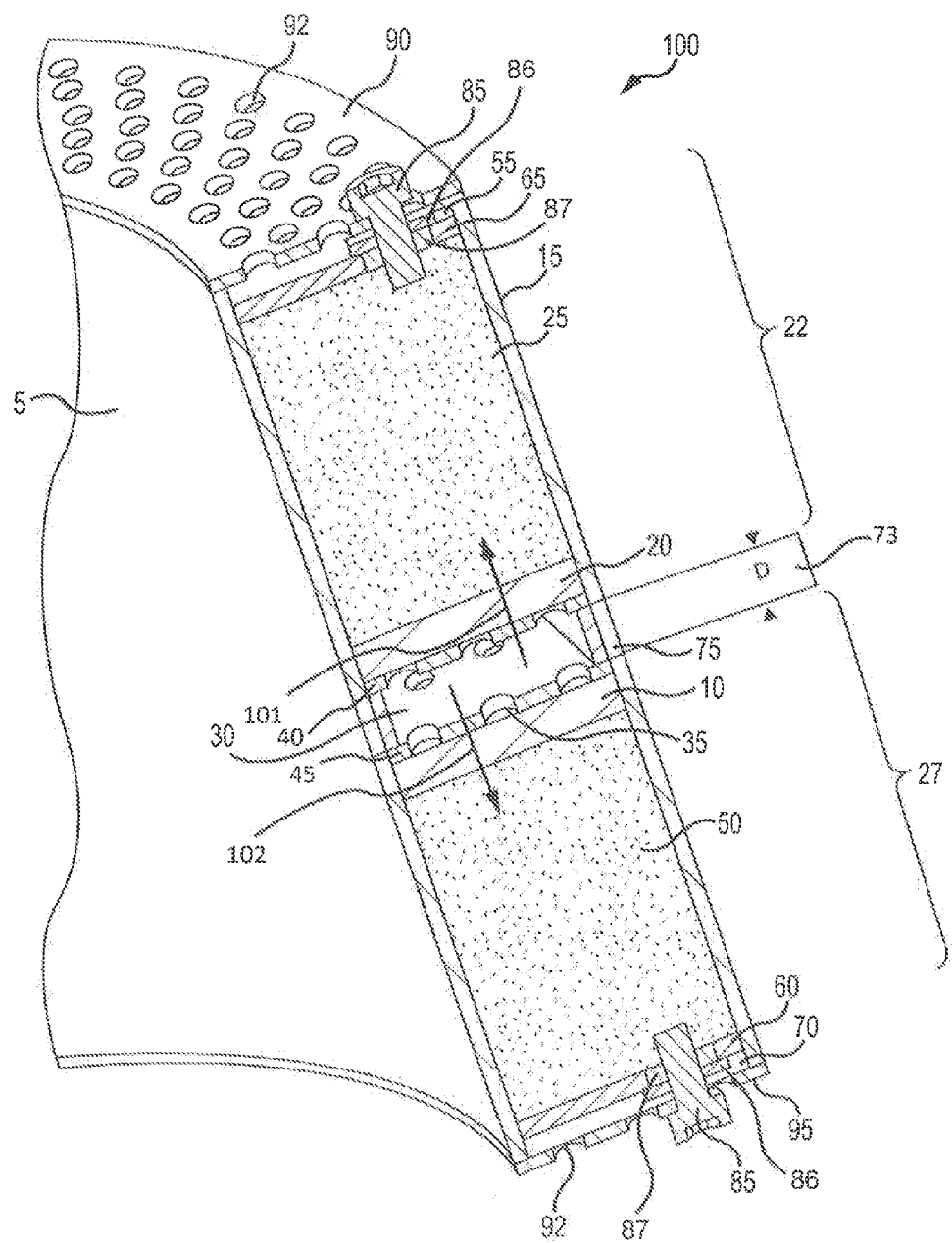
FIG. 2 is a representative diagram of the split flow filter of FIG. 1 along a cut plane B-B' in accordance with various embodiments.

According to various embodiments and with reference to FIGS. 1 and 2, a diagram of a concentric split flow filter 100 (e.g., filter unit) is presented. Concentric split flow filter 100 may be designed for use with a universal waste management system (UWMS). Air is pulled from a commode and delivered to an odor/bacteria filter to capture odor-causing molecules and bacteria. The filter media of concentric split flow filter 100 comprises activated charcoal, for example, activated charcoal developed for use on the ISS WCS. To reduce system volume, the UWMS concentric split flow filter 100 surrounds a commode transfer tube which is the conduit between a seat and a fecal collection canister (not shown). The transfer tube is concentric to the split flow filter 100 and may be located closely adjacent to an interior surface 5 of concentric split flow filter 100. Concentric split flow filter 100 may be utilized as an orbital replacement unit, for example, to support longer-duration missions In a traditional configuration of a WCS, air to be filtered enters through a central plenum and traverses radially through the filter media. Prior art odor/bacteria filters were cylindrical in form and were housed separately. However, present and future space vehicles designs demand a significantly reduced overall WCS volume, such as a reduction of about 80% from conventional systems. The conventional cylindrical filter did not support this volume challenge. The conventional WMS had a central cylinder, commonly referred to as the transport tube, acting as a conduit to translate fecal matter to a fecal can. The conventional design left an empty volume around transport tube and as such, occupied excessive volume.

According to various embodiments, the concentric split flow filter 100 may be designed to effectively fill the volume that was previously considered to be underutilized space surrounding the transport tube. The concentric split flow filter 100 is configured to remove odor and/or bacteria from pumped air used to collect urine and fecal waste products. Further, the design of concentric split flow filter 100 splits the flow, with substantially half of the air flow to be treated traveling through a first bed of filter media 25 (FIG. 2), and substantially the other half of the air flow to be treated traveling through the second bed of filter media 50. This split flow design reduces the air velocity by 50%. Since the pressure drop can be as much as a squared function of air velocity, the pressure drop of concentric split flow filter 100 may be reduced by as much as a factor of 4 as compared to the pressure drop in conventional filter designs since the air velocity is substantially split in half.

According to various embodiments, concentric split flow filter 100 is designed to utilize an axial flow pattern. As used herein, an axial flow pattern refers to an air flow that flows generally parallel to the axis of the cylinder, such as axis A-A'. As used herein, a radial flow refers to an air flow which is substantially perpendicular to the axis of the cylinder, such as perpendicular to axis A-A'. As used herein, air flow may be measured by the volume of air per unit of time that flows through a particular point.

In space applications such as the ISS, a pressure drop may be a limiting design constraint. Thus, a pressure drop through a filter may be a design defining parameter. Because pressure drop (i.e., head loss) is a function of velocity squared, doubling the flow rate doubles velocity which quadruples pressure drop. For instance, the Darcy-Weisbach equation:

$$\Delta p = f_D \cdot \frac{L}{D} \cdot \frac{\rho V^2}{2}$$

where the pressure drop (or loss) due to friction $\Delta p$ (Pa) is a function of: the ratio of the length to diameter of the pipe, L/D; the density of the fluid, $\rho$ (kg/m$^3$); the mean velocity of the flow, V (m/s); and the Darcy Friction Factor, a (dimensionless) coefficient of laminar, or turbulent flow, $f_D$.

In operation, according to various embodiments, and with continued reference to FIGS. 1 and 2, air to be filtered may be introduced to air flow inlet 75 via inlet port 73. Air to be filtered may pass through air flow inlet 75 and flow into inlet air flow plenum 30. The inlet port 73 diameter "D" may be substantially equal to the height of inlet air flow plenum 30. Inlet air flow plenum 30 may be hollow cylinder in shape. This air flow to be filtered enters inlet air flow plenum 30 which is a hollow cylinder. Since fluid flow, such as air, travels the path of least resistance, after filling the cylinder, the air substantially splits equally since each bed of filter media 25, 50 has a very similar flow resistance (i.e., the air splits into air flow portion 101 and air flow portion 102) as it travels through a first perforated plate 40 and a second perforated plate 45 to enter the first bed of filter media 25 or the second bed of filter media 50, respectively. The inlet air flow plenum 30 may be positioned sustainably equidistant between top perforated plate 90 and bottom perforated plate 95. Stated another way, inlet air flow plenum 30 may be positioned in the mid-point of concentric split flow filter 100. First bed of filter media 25 may be hollow cylinder in shape. First bed of filter media 25 may be internal to housing 1. Thus, substantially half the air flow to be treated travels into the first bed of filter media 25 and substantially half the air flow to be treated travels into the second bed of filter media 50. In this way the velocity of the air flow to be treated is effectively reduced by 50%. Thus, one fourth of the previous pressure drop may be experienced, which as described above is desirable.

According to various embodiments, air may be drawn through the transport tube 300 (FIG. 1) towards a fecal bag (not shown) to control odor and to assist with the collection of feces. The transport tube 300 may be a tube concentric to and/or interior to a cylindrical shaped housing 1 surface, e.g., interior surface 5. Though they may be any shape, interior surface 5 and exterior surface 15 of housing 1 may be substantially parallel. Interior surface 5 and exterior surface 15 may be made from any desired material. However, interior surface 5 and exterior surface 15 may be advantageously made from a material that is able to house corrosive ammonia without decreased product life. Exemplary materials include for example, fiberglass, steel, stainless steel, titanium, and/or a polymeric material. Interior surface 5 and exterior surface 15 of housing 1 may span between a top perforated plate 90 and a bottom perforated plate 95. Interior surface 5, exterior surface 15, top perforated plate 90 and bottom perforated plate 95 may form a torrid, such as a hollow cylinder. Similarly, air may be drawn through a hose to assist with the collection of urine. These air flows, e.g., air flow through the transport tube and air flow through the urine collection hose may be jointly plumbed. This air flow may become the air flow to be treated by the split flow filter 100. Air flow to be treated may be introduced, via a fan and/or impeller, to air flow inlet 75 via a hose 73 and enter into inlet air flow plenum 30. Air flow inlet 75 may be one or more pass-through voids through exterior surface 15. Back pressure and/or the resistance of the charcoal on the top 22 and the bottom 27 cause the air flow to be treated to equalize inside inlet air flow plenum 30 substantially around the diameter of concentric split flow filter 100. Thus, a relatively even distribution of air is achieved from inlet air flow plenum 30 to the first bed of filter media 25 and the second bed of filter media 50 (e.g., the air splits into air flow portion 101 and air flow portion 102). Based on this design, treatment surfaces near air flow inlet 75 tend not become overworked or clogged.

Air flow to be treated within inlet air flow plenum 30 travels through first perforated plate 40 and the second perforated plate 45 to enter the first bed of filter media 25 or the second bed of filter media 50 such as via apertures 35 that pass through first perforated plate 40 and the second perforated plate 45. The first perforated plate 40 and the second perforated plate 45 may be hollow cylinder in shape. As previously mentioned the air flow will generally take the path of least resistance.

A layer of a first retaining substance 20, such as felt, may be substantially adjacent to and/or between the first bed of filter media 25 and the first perforated plate 40. The layer of the first retaining substance 20 may span the diameter of concentric split flow filter 100 and/or a portion thereof, as desired. Stated another way, the layer of the first retaining substance 20 may be hollow cylinder in shape. The first retaining substance 20 may be configured to retain the filter media 25 in position and/or act as a first barrier to filter out any particulates so that they cannot re-enter the cabin. The filter media 25 may be any desired filer media configured to control odor and assist in waste capture; however as noted above, as the velocity of the air flow traveling through this media is a limiting design constraint, since it is accounts for a considerable impact in determining the fluids pressure drop through the filtering system, care must be taken in in both filter media selection and when determining the needed amount of media. The flow of air to be treated passes through the retaining substance 20 to the filter media 25, such as a charcoal based media. Instead of being a hollow cylinder, as shown, the filter media 25 may be any desired shape within interior surface 5 and exterior surface 15 of housing 1. The filter media 25 may be configured to absorb odor causing constituents in the air flow, such as methane and/or ammonia. A second retaining substance 65, which may comprise the same materials as retaining substance 20, may be positioned adjacent to and/or between the first bed of filter media 25 and the top perforated plate 90. In response to traveling through filter media 25 the air to be treated may be transformed into treated air flow. A treated air flow plenum 55 may be situated between the second retaining substance 65 and the top perforated plate 90. Treated air may return to the cabin by traveling through the treated air flow plenum 55 and out aperture 92.

According to various embodiments, the operation of concentric split flow filter 100 is generally equivalent on top and bottom; however for completeness, the second bed of filter media 50 will be briefly described blow. A layer of a first retaining substance 10, such as felt, may be substantially adjacent to and/or between the second bed of filter media 50 and the second perforated plate 45. The layer of the first retaining substance 10, such as felt, may span the diameter of concentric split flow filter 100 and/or a portion thereof, as desired. The first retaining substance 10 may be configured to retain the filter media 50 in position and/or act as a first barrier to filter out particulates so that they cannot re-enter the cabin. The flow of air to be treated passes through the first retaining substance 10 to the filter media 50, which may be, for example, a charcoal based media. Filter media 50 may be hollow cylinder in shape. Filter media 50 may be internal to housing 1. The filter media 50 may be configured to absorb odor causing constituents are in the air flow, such as methane and/or ammonia. A second retaining substance 60, which may comprise the same materials as retaining substance 10, may be positioned adjacent to and/or between the second bed of filter media 50 and the bottom perforated plate 95. In response to traveling through filter media 50 the air to be treated may be transformed into treated air flow. A treated air flow plenum 70 may be situated between the second retaining substance 60 and the bottom perforated plate 95. Treated air may return to the cabin by traveling through the treated air flow plenum 70 and out aperture 92. A retention structure 85, such as a bolt, working with a retention mechanism 87, such as a threaded chamber, may couple the elements of concentric split flow filter 100 together, such as top perforated plate 90, interior surface 5, exterior surface 15, bottom perforated plate 95 and/or the elements within these structures together. A spacer 86, such as a washer, may assist with retaining elements of the filter unit in position and maintaining the shape of treated air flow plenums 55, 70.

The top portion 22 and bottom portion 27 of concentric split flow filter 100 comprising the first bed of filter media 25 and the second bed of filter media 50 are configured to act in tandem, such as substantially simultaneously as a single filter structure. The top portion 22 and bottom portions 27 of concentric split flow filter 100 are configured to have similar operational life spans. The volume of filter media 25 within first bed of filter media 25 is substantially equivalent to the volume of filter media 50 within the second bed of filter media 50.

Figure 3:
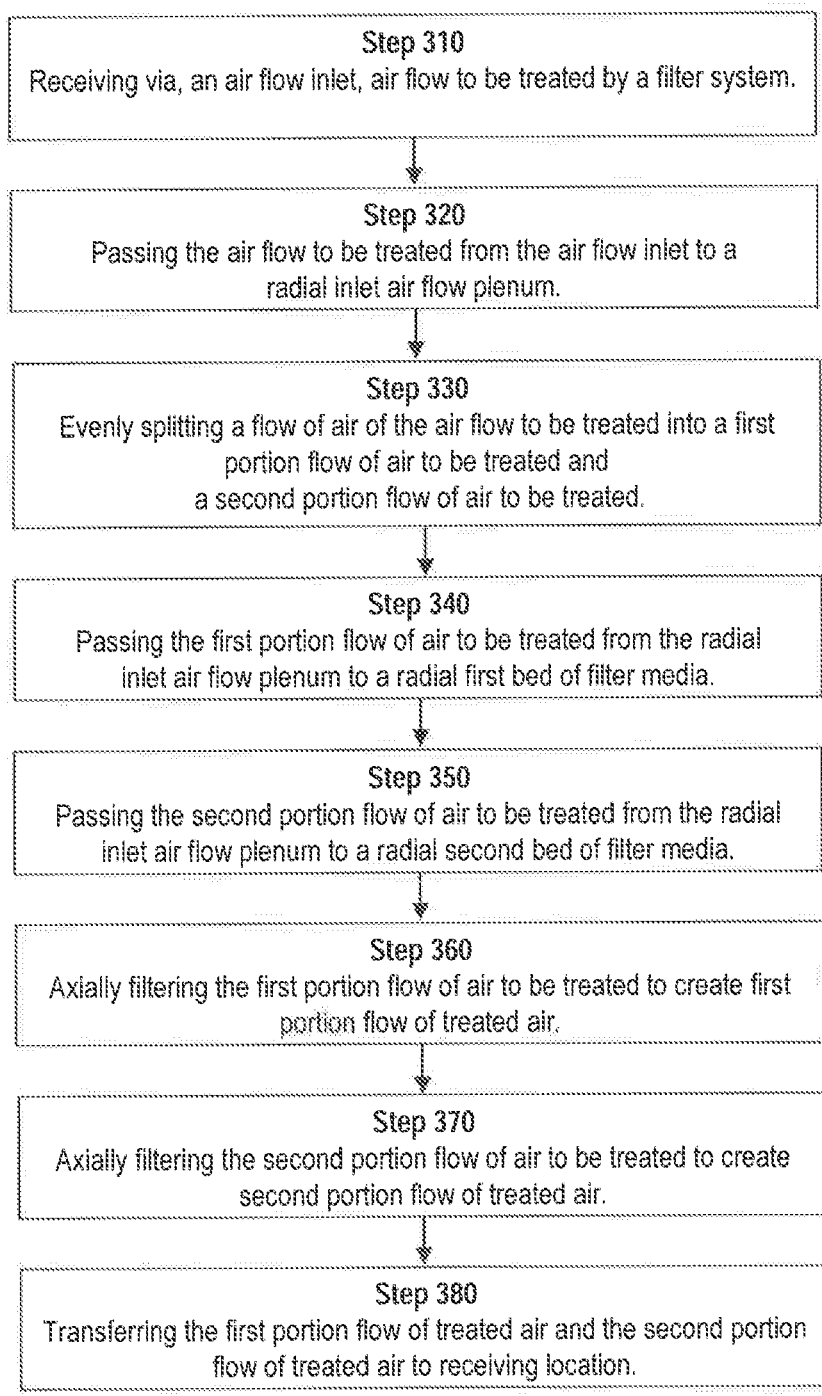
FIG. 3 is a flow diagram of use of the split flow filter in accordance with various embodiments.

According to various embodiments and with reference to FIG. 3 a method of using concentric split flow filter 100 may comprise receiving, via an air flow at inlet 75, air flow to be treated by a filter system (step 310). Air flow to be treated may be passed from the air flow inlet 75 to a radial inlet air flow plenum (step 320). The volume of the air flow to be treated may be substantially evenly split into a first portion 101 flow of air to be treated and a second portion 102 flow of air to be treated. (step 330). The first portion 101 flow of air to be treated may be passed from the radial inlet air flow plenum to a first bed of filter media 25 (step 340). The second portion 102 flow of air to be treated may be passed from the radial inlet air flow plenum to a second bed of filter media 50 (step 350). The method may include axially filtering the first portion 101 flow of air to be treated to create first portion 101 flow of treated air and axially filtering the second portion 102 flow of air to be treated to create second portion 102 flow of treated air (step 360, 370). The first portion 101 flow of treated air and the second portion 102 flow of treated air may be transferred to receiving location, such as back to the cabin of an aerospace vehicle (step 380).

Concentric split flow filter 100 may be configured for use within the ISS, low earth orbit (LEO) aircraft, crew exploration vehicle (CEV), and/or a space hotel. Stated another way, concentric split flow filter 100 may be an element of an aerospace waste collector system. Similarly, as filters may be used throughout most chemical processing plants and a variety of filtration needs, due to the volume savings concentric split flow filter 100 affords, this solution is applicable on most vehicles and other systems that have "high density" packaging needs.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A filter unit comprising:
   a housing having a first outlet, a second outlet and an inlet plenum there-between,
   wherein the housing is generally toroidal comprising a hollow cylinder shape configured to encircle a waste transparent tube;
   a first filter media positioned within the housing between the inlet plenum and the first outlet;
   a second filter media positioned within the housing between the inlet plenum and the second outlet, wherein the first filter media and the second filter media are disposed axially on opposite sides of the inlet plenum, and the first outlet and the second outlet are disposed axially on opposite sides of the inlet plenum, the filter unit configured for air flow in an axial direction substantially parallel to a center axis of the housing and substantially parallel to a center axis of the waste transport tube.

2. The filter unit of claim 1, wherein the first filter media is generally hollow cylinder shaped, and wherein the second filter media is generally hollow cylinder shaped.

3. The filter unit of claim 1, further comprising:
   a first retaining substance positioned between the inlet plenum and the first filter media, wherein the first retaining substance is generally hollow cylinder shaped; and
   a second retaining substance positioned between the inlet plenum and the second filter media, wherein the second retaining substance is generally hollow cylinder shaped.

4. The filter unit of claim 3, further comprising:
   a first perforated plate positioned between the first retaining substance and the first filter media, wherein the first perforated plate is generally hollow cylinder shaped; and
   a second perforated plate positioned between the first retaining substance and the second filter media, wherein the second perforated plate is generally hollow cylinder shaped.

5. The filter unit of claim 3, wherein at least one of the first retaining substance or the second retaining substance is configured to retain filter media in position and act as a first barrier to filter out particulates.

6. The filter unit of claim 1, wherein the inlet plenum is generally hollow cylinder shaped.

7. The filter unit of claim 1, wherein the first filter media and the second filter media are configured for filtering in an axial direction substantially parallel to the center axis of the housing.

8. The filter unit of claim 1, wherein the filter unit is an element of an aerospace vehicle waste collector system.

9. The filter unit of claim 1, wherein at least one of the first filter media or the second filter media is configured to reduce velocity of air exiting the inlet plenum by 50%.

10. The filter unit of claim 1, wherein the housing is concentric to the waste transport tube of a waste management system, wherein the waste transport tube is configured to have waste pass through the waste transport tube.

11. The filter unit of claim 1, further comprising an inlet coupled to the inlet plenum configured to introduce a flow of air into the inlet plenum.

\* \* \* \* \*